United States Patent [19]

Weider et al.

[11] Patent Number: 5,274,182

[45] Date of Patent: Dec. 28, 1993

[54] SATURATED, LIQUID ISOBUTYLENE POLYMERS TERMINALLY FUNCTIONALIZED BY SPECIAL GROUPS

[75] Inventors: Richard Weider, Leverkusen; Thomas Scholl, Bergisch Gladbach, both of Fed. Rep. of Germany

[73] Assignee: Bayer Aktiengesellschaft, Leverkusen

[21] Appl. No.: 904,646

[22] Filed: Jun. 26, 1992

[30] Foreign Application Priority Data

Jul. 9, 1991 [DE] Fed. Rep. of Germany ....... 4122655

[51] Int. Cl.$^5$ ................. C07C 263/10; C07C 265/04; C07C 211/09; C07C 321/14
[52] U.S. Cl. ..................... 560/347; 560/338; 560/355; 564/278; 568/66; 568/840; 568/910.5
[58] Field of Search ............... 560/338, 347, 355; 564/278; 568/66, 840, 910.5

[56] References Cited

U.S. PATENT DOCUMENTS

| | | | |
|---|---|---|---|
| 2,319,057 | 5/1943 | Hansford | 560/355 |
| 3,427,351 | 2/1969 | Nakagawa et al. | 560/190 |
| 3,790,549 | 2/1974 | Feniak | 525/388 X |
| 4,304,731 | 12/1981 | Nishino et al. | 560/355 X |
| 4,336,356 | 6/1982 | Aharoni et al. | 525/388 |
| 4,358,566 | 11/1982 | Ver Strate | 525/339 |
| 4,574,059 | 3/1986 | Kervennal et al. | 560/347 |
| 5,047,097 | 9/1991 | Sayles | 149/19.4 |

FOREIGN PATENT DOCUMENTS 0382405 8/1990 European Pat. Off. .
1520311 2/1970 Fed. Rep. of Germany .
1170097 11/1969 United Kingdom .

OTHER PUBLICATIONS

Jones, E. B. and Marvel, C. S.; *Journal of Polymer Science: Part A;* vol. 2, pp. 5313-5318, (1964).

*Primary Examiner*—Jose' G. Dees
*Assistant Examiner*—Vera C. Clarke
*Attorney, Agent, or Firm*—Connolly and Hutz

[57] ABSTRACT

Saturated, liquid, low molecular weight and low-viscosity isobutylene polymers terminally functionalized by special groups, which correspond to the following formula

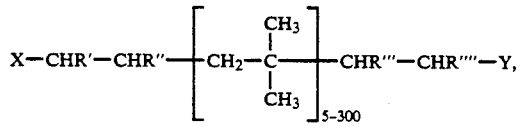

are produced by solution ozonolysis of high molecular weight isobutylene/diene copolymers containing diene monomers, stabilization of the products obtained after the ozone treatment by addition of peroxide decomposers and subsequent reduction with hydrogen in the presence of hydrogenation catalysts under pressures of 10 to 300 bar and at temperatures of 20° to 300° C., optionally in the presence of sulfur or amines or ammonia.

6 Claims, No Drawings

SATURATED, LIQUID ISOBUTYLENE POLYMERS TERMINALLY FUNCTIONALIZED BY SPECIAL GROUPS

This invention relates to a process for the production of saturated, liquid, low molecular weight and low-viscosity isobutylene polymers terminally functionalized by special groups, to new terminally functionalized isobutylene polymers and to their use for the production of, for example, low-viscosity rubber mixtures.

Terminally functionalized, liquid isobutylene polymers are already known. U.S. Pat. No. 3,427,351 describes the production of a saturated carboxyl-terminated isobutylene polymer by oxidative decomposition of the ozonides obtained by ozonolysis of isobutylene/diene copolymers.

The polymers containing -COOH- groups obtained by oxidative decomposition of the ozonolysis products initially formed offer only a limited range of crosslinking agents because they can only be crosslinked with epoxides or salts. The use of other curing agents, for example for faster curing, is not possible.

The conversion of the products obtained by ozone treatment of suitable olefin/diene copolymers with hydrazine or hydroxylamine into hydrazones or oximes suitable for curing with epoxy resins is described in DE-OS 2 147 874.

The reaction products contain a —C=N—N— or —C=N—O— group highly sensitive to hydrolysis and oxidation (see, for example, Houben-Weyl, Methoden der organischen Chemie, Vol. 6/3 and 7/1) which seriously restricts their use.

EP 0 012 316 describes a process for the production of polymers terminated by saturated carboxyl or hydroxy groups by ozonization of an olefin copolymer containing a diene in a special solvent mixture and subsequent decomposition of the ozonides by oxidation to carboxyl groups and/or by reduction with complex hydrides to hydroxyl groups.

The use of complex hydrides for reduction of the products obtained after the ozone treatment, which is mentioned in the above patent specification (EP 0 012 316), does not lead to the relatively large quantities required for the application of such reactive polymers on an industrial scale. As any expert knows, the complex hydrides are highly sensitive to hydrolysis and, in some cases, are self-igniting with water which seriously limits their use on a relatively large scale on account of the safety risk. In addition, where equivalent quantities of such reducing agents are used, a solid non-stirrable gel is formed after a short time through salt formation (see, for example, Journal of Polymer Science, A2 (1964), page 5316) and can only be redissolved after the further addition of a very large excess of reducing agent (see Example 22 of the above patent specification)—a high-risk measure in view of the non-stirrability of the gel. On completion of the reaction, the excess has to be destroyed with vigorous evolution of hydrogen and the solution of the polymer has to be freed from salts by washing and dried. Overall, this process is not suitable for working on an industrial scale.

Accordingly, the present invention relates to a process for the production of liquid, saturated polymers corresponding to the following formula

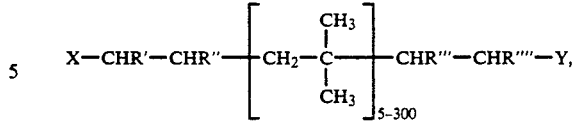

wherein

R', R'', R''' and R'''' represent hydrogen or a $C_{1-3}$ alkyl group and at least two of the substituents are hydrogen, which have a molecular weight $M_n$ of 300 to 10,000 and preferably 500 to 5,000 and which bear groups X and Y—essentially positioned at the ends of the polymer chain—with the meanings OH, SH, $NR^1R^2$, N=C=O or $N=C(R^2)_2$, X being the same as Y and the number of groups X+Y per polymer being from 1.8 to 2.5, by solution ozonolysis of a high molecular weight isobutylene/diene copolymer containing 0.5 to 15 mol-% of a diene monomer, characterized in that the products formed after the ozone treatment are stabilized by addition of peroxide decomposers and are decomposed by reduction with hydrogen in the presence of hydrogenation catalysts under pressures of 10 to 300 bar and at temperatures of 20 to 300° C., optionally in the presence of sulfur or amines having the structure $NHR^1R^2$ and, where the amine is ammonia, the $NH_2$ groups formed are optionally converted into the groups N=C=O or $N=C(R^2)_2$ by reaction with phosgene or with ketones or aldehydes, $R^1$ representing hydrogen or an optionally substituted aliphatic, cycloaliphatic or aromatic $C_{1-16}$ hydrocarbon radical optionally bearing hydroxyl or amino groups and $R^2$ representing hydrogen or an optionally substituted aliphatic, cycloaliphatic or aromatic $C_{1-16}$ hydrocarbon radical.

The process according to the invention is carried out on a high molecular weight solid polymer which is obtainable by copolymerization of isobutylene with 0.5 to 15 mol-% dienes, preferably conjugated dienes, such as butadiene, isoprene, 2-chloro-1,4-butadiene, 2-mono-1,4-butadiene, pentadiene, hexadiene, 2-ethyl-1,3-butadiene, 2-propyl-1,3-butadiene,2-phenyl-1,3-butadiene,2,3-dimethyl-1,3-butadiene, 2-methyl-1,3-pentadiene or 3-propoxy-1,3-hexadiene and which is commercially available, for example, as butyl rubber. Isoprene is particularly preferred as the diene monomer. The dienes are bonded for the most part in the 1,4-position. Small numbers of 1,2-bonds which are present in all commercially available butyl rubbers and which cannot be completely suppressed lead to equally small numbers of lateral functional groups and, hence, to polymers containing more than two functional groups per polymer chain.

The polymers obtained in accordance with the invention contain approximately 1.8 to 2.5 and preferably 1.8 to 2.2 functional groups per polymer chain.

The starting polymer used in the process according to the invention has a Mooney viscosity (ML 1+8, 125° C.) of approx. 30 to 80 and preferably 40 to 70 and molecular weights $M_n$ of at least 80,000. Much lower molecular weights lead to products containing less than 1.8 functional groups per polymer chain. However, the molecular weight may vary within wide limits and is preferably in the range from 100,000 to 1,000,000.

The terminal functional groups, OH, SH, $NR^1R^2$, $N\!=\!C\!=\!O$ or $-N\!=\!C(R^2)_2$ of the polymers obtained by the process according to the invention are attached to primary and/or secondary carbon atoms, depending on the nature of the diene monomers in the starting polymer. In the case of the preferred diene monomer, isoprene, the terminal functional groups, for example, are present in the polymers according to the invention in a ratio of 1:1 as structures corresponding to the formulae $-CH_2-CH_2-X$ and $CH_2-CH(CH_3)-X$, where X is the particular functional group.

In the process according to the invention, the high molecular weight isobutylene/diene copolymer is ozonized in the usual way in an ozone-containing gas stream produced in a typical ozone generator from pure oxygen or an oxygen-containing dry gas mixture, such as air. The ozone content of the gas stream is up to 15% by volume and preferably from 0.5 to 10% by volume. For ozonolysis, the copolymer is dissolved in an organic solvent, preferably a saturated, optionally halogenated, aliphatic or cycloaliphatic hydrocarbon or ether. Suitable solvents are, for example, pentane, hexane, cyclohexane, light gasolines, petroleum ether, tetrahydrofuran, methylene chloride, chloroform, tetrachloromethane, tetrachloroethane or mixtures thereof. The concentration of the copolymer in the solvent is selected so that the viscosity of the solution is suitable for dispersing the ozone-containing gas. It is preferably in the range from 5 to 30% by weight.

The ozonolysis is carried out at a temperature of $-20°$ to $100°$ C. and preferably at a temperature of $-10°$ to $25°$ C.

The quantity of ozone is determined by the degree of unsaturation in the copolymer and the desired extent of the degradation, one mol ozone per mol double bonds in the copolymer being used for complete decomposition. An unwanted excess of ozone can be avoided in the process according to the invention by determination of the acid value which only increases after all the double bonds have been consumed.

The product formed on completion of ozonolysis is stabilized to prevent unwanted oxidation by the peroxides formed. Peroxide decomposers of the type described, for example, in Houben-Weyl, Methoden der organischen Chemie, Vol. 8, pages 63 et seq., are used as stabilizers. Aqueous solutions of sodium borohydride or formaldehyde are particularly preferred. By contrast, stabilization by introduction of hydrogen in the absence of pressure into the ozonolysis solution containing small quantities of a hydrogenation catalyst, which is also possible in principle, cannot be carried out on an industrial scale on account of the increased danger of explosion of the ozone- or oxygen-hydrogen mixtures formed. The peroxide decomposers are used in a quantity of 1 to 4 mol and preferably in a quantity of 1 to 2 mol per mol ozone introduced.

In a following process step, the stabilized product is reduced, optionally in the presence of sulfur or primary amines. The sulfur or the amines may be added before or together with the hydrogenation catalyst or even before stabilization. Suitable sulfur or nitrogen containing agents for the process according to the invention are elemental sulfur or hydrogen sulfide or ammonia and also primary aliphatic, cycloaliphatic or aromatic amines, such as methylamine, ethylamine, propylamine, isopropylamine, butylamine, sec.-butylamine, isobutylamine, tert.-butylamine, hexylamine, 2-ethylhexylamine and cyclohexylamine, or aniline and primary, aliphatic, cycloaliphatic or aromatic hydroxy- or amine-substituted amines, such as 2-aminoethanol, 2-(2-aminoethylamino)ethanol, 2-amino-1-propanol, 1-amino-2-propanol, ethylene diamine, diethylene triamine, 1-amino-2-diethylaminoethane, 1,2-diaminopropane, hexamethylene diamine, 1,4-diaminocyclohexane, 5-amino-1-aminoethyl-1,3,3-trimethylcyclohexane, bis-(4-aminocyclohexyl)-methane, phenyl diamine, 4-aminodiphenyl amine, 2,4-diamino-1-methyl benzene or bis-(4-aminophenyl)-methane.

Ammonia and the procedure where no sulfur or amines are used is particularly preferred. In the absence of sulfur or amines, the OH-functional polymers are formed.

The quantity of sulfur, hydrogen sulfide or amines added is approximately 10 to 200 mol and preferably 50 to 100 mol per mol ozone introduced.

Hydrogen is used as the reducing agent in the presence of hydrogenation catalysts known per se, such as palladium, platinum, platinum/carbon, Raney nickel or copper chromite. The catalysts may be used both in free form and on a suitable support material. Preferred hydrogenation catalysts are Raney nickel and copper chromite. Where sulfur is added, only sulfur-active hydrogenation catalysts, for example sulfides or polysulfides of cobalt, nickel, iron or molybdenum, may be used. In this case, the catalyst is used in a quantity of approx. 10 to 100 g and preferably in a quantity of 30 to 70 g per kg polymer.

The solvent used for the reduction step may be the same as the solvent used for the ozonolysis step except in the case of halogenated solvents. However, polar solvents, such as tetrahydrofuran and/or dioxane, are advantageously used. The solvent may even be omitted altogether.

After addition of the hydrogenation catalyst, hydrogenation is preferably carried out under pressures of 100 to 300 bar and at temperatures of $50°$ to $200°$ C., optionally in the presence of the sulfur or the amine.

The progress of reduction may be followed, for example, by evaluating the intensity of the band at 1,720 $cm^{-1}$ in the infrared spectrum which disappears in the event of complete conversion.

After the reduction step, the polymers containing $NH_2$ groups formed where ammonia is used as the amine may optionally be converted in known manner (see Houben-Weyl, Methoden der organischen Chemie, Vol. 8, pages 199 et seq. and Chemical Reviews 63 (1963), pages 409 et seq.) into the groups $N\!=\!C\!=\!O$, for example by reaction with phosgene or into the groups $N\!=\!C(R^2)_2$ by reaction with ketones or aldehydes having the formula $O\!=\!C(R^2)_2$.

The present invention also relates to liquid, saturated polymers obtainable by the process according to the invention corresponding to the following formula

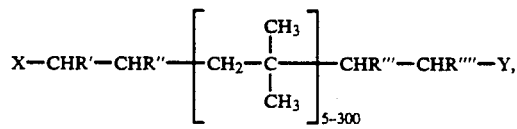

wherein
R', R", R''' and R'''' represent hydrogen or a $C_{1-3}$ alkyl group and at least two of the substituents are hydrogen, which have a molecular weight $M_n$ of 300 to 10,000 and which bear groups X and Y—essentially positioned at the ends of the polymer chain—with the meanings SH, $NR^1R^2$, $N=C=O$ or $-N=C(R^2)_2$, X being the same as Y and the number of groups X+Y per polymer being from 1.8 to 2.5, and $R^1$ represents hydrogen or an optionally substituted aliphatic, cycloaliphatic or aromatic $C_{1-16}$ hydrocarbon radical optionally bearing hydroxyl or amino groups and $R^2$ represents hydrogen or an optionally substituted aliphatic, cycloaliphatic or aromatic $C_{1-16}$ hydrocarbon radical.

Preferred polymers are those which contain 1.8 to 2.2 mol groups $NHR^1$ or $N=C=O$ per mol polymer and in which the groups are positioned at the ends of the polymer chain.

The liquid polymers produced by the process according to the invention are particularly suitable for the production of low-viscosity rubber mixtures filled with carbon black or other known fillers. The Mooney viscosity of the rubber mixtures depends upon the type and quantity of filler and is preferably below 50 (ML 4, 125° C.).

By virtue of their very good flow properties, these rubber mixtures are particularly suitable for the production of very thin-walled or complicated rubber articles by casting, injection molding, reaction injection molding or extrusion and vulcanization with polyfunctional crosslinking agents. In addition, they may be used for the solventless coating of fabrics by virtue of their low viscosity. The properties of butyl rubber, such as high resistance to weathering and oxidation and also low permeability to gases, are imparted to the rubber articles. The choice of the crosslinking agent is dictated by the terminal groups still present in the liquid rubbers and by the desired vulcanization rate. The desired properties and crosslinking kinetics may be varied within wide limits. Polyisocyanates, for example, are suitable for the terminal groups —OH, $-NR^1R^2$ and $-N=C(R^2)_2$, polyepoxides are suitable for the terminal groups —OH, $-NR^1R^2$ and —SH and polyhydroxy compounds and polyamines are suitable for the terminal group $-N=C=O$.

The polymers according to the invention show a considerably increased crosslinking rate with the above-mentioned crosslinking agents in relation to the terminal —OH or —COOH group.

In addition, the process according to the invention is also suitable for the preparation of oligomers used for the production of plastics, such as polyamides, polyesters, polycarbonates or polyurethane(urea)s.

EXAMPLES

Example 1 a) 400 g isobutylene/isoprene rubber having an isoprene content of 1.6 mol-% and a Mooney viscosity of 51 (ML 1+8, 125° C.) (Polysar Butyl 301, a product of Polysar) are dissolved in 1.5 l petroleum ether. An ozone-enriched stream of oxygen (50 l/h, quantity of ozone approx. 4 g/h) is introduced into the solution with stirring at 0° to 10° C. until the calculated quantity of ozone (2.75 g) has been absorbed. After purging with nitrogen, a solution of 5 g sodium borohydride in 20 ml 50% ethanol is added with vigorous stirring, after which the mixture is stirred until no more peroxides can be detected with starch iodide paper. The aqueous phase is separated off, the organic phase is dried over sodium sulfate and the solvent is distilled off. A strong band appears at 1,720 cm$^{-1}$ in the IR spectrum of the residual oil.

b) The oil is dissolved in 500 ml tetrahydrofuran and the resulting solution is hydrogenated at 200° C./150 bar hydrogen pressure with addition of 20 g Raney nickel until the IR band at 1,720 cm$^{-1}$ has disappeared. After filtration, the solvent is distilled off. The OH-terminated polymer formed has a molecular weight $M_n$ of 4,320 g/mol (as determined by GPC) and an OH value (as determined by titration using the acetylation method) of 25 to 26.

Example 2

The oil of Example 1a) is dissolved in 500 ml tetrahydrofuran and the resulting solution is hydrogenated at 150° C./150 bar hydrogen pressure with addition of 20 g Raney nickel and 200 g ammonia until the IR band at 1,720 cm$^{-1}$ has disappeared. After filtration, the solvent is distilled off. The $NH_2$-terminated polymer formed has a molecular weight $M_n$ of 4,450 g/mol (as determined by GPC) and an NH value (as determined by titration with HCl) of 25 to 26.

Example 3 a) Example 1a) is repeated with 400 g of isobutylene/isoprene rubber having an isoprene content of 2.2 mol-% and a Mooney viscosity of 47 (ML 1+8, 125° C.) (Polysar Butyl 402, a product of Polysar). Carbon tetrachloride is used as the solvent. The calculated quantity of ozone is 3.75 g. The sodium borohydride solution is replaced by a 45% aqueous formaldehyde solution (20 ml). The solution thus treated is peroxide-free after drying.

b) The oil formed is treated as in Example 1b). An OH-terminated liquid polymer having a molecular weight $M_n$ of 3,150 g/mol (as determined by GPC) is obtained. It has an OH value of 34.5 to 35.5.

Example 4

The oil of Example 3a) is treated as in Example 2. An $NH_2$-terminated liquid polymer having a molecular weight $M_n$ of 3,540 g/mol (as determined by GPC) is obtained. It has an NH value (as determined by titration with HCl) of 31.5 to 32.5.

Example 5

The procedure is as in Example 4, except that 200 g methylamine are used instead of ammonia. The $NHCH_3$-terminated polymer obtained has an NH value of 29.

Example 6

Comparison Example

The oil of Example 1a) is dissolved under nitrogen in 3 l absolute tetrahydrofuran. The calculated quantity (1.14 g) lithium aluminium hydride is then slowly added with vigorous stirring in the absence of moisture. After a few minutes the solution begins to undergo an increase in viscosity which continues until, after about 20 minutes, it is solid. The solution only becomes stirrable again after the addition of another 2 l tetrahydrofuran and 10 g lithium aluminium hydride. The excess lithium aluminium hydride is hydrolyzed with isopropanol and water in a nitrogen atmosphere with vigorous evolution of hydrogen and the solvent is distilled off. The residue is taken up in 2 l petroleum ether and washed with water until salt-free, only slowly separating emulsions being formed. The organic phase is dried with sodium sulfate and concentrated by evaporation. The OH-terminated polymer thus produced, has an OH value of 21.

Example 7

The NH$_2$-terminated polymer of Example 4 is dissolved in 1 l chlorobenzene and the resulting solution is added dropwise at 0° C. to a solution of 100 g phosgene in 500 ml chlorobenzene. The temperature is then slowly increased to 80° C., after which the solvent is distilled off under reduced pressure. After drying in a high vacuum, the NCO-terminated polymer obtained has an NCO content of 2.1%, as determined by titrimetry.

Example 8

The NH$_2$-terminated polymer of Example 4 is dissolved in 1 liter cyclohexane and heated on a water separator with addition of 50 ml 2-butanone and 1 g acidic ion exchanger resin until the condensation is complete. The IR spectrum of the imine-terminated polymer obtained after concentration by evaporation and drying shows a characteristic band at 1,600 cm$^{-1}$.

Example 9

Example 3a) is repeated. The oil obtained after concentration by evaporation is taken up in 500 ml cyclohexane and, after the addition of 5 g freshly prepared cobalt polysulfide (composition approx. CoS$_3$) and 10 g sulfur, is hydrogenated with hydrogen at 200 bar/150° C. The solution is filtered, washed carefully with water and dried and the solvent and residual hydrogen sulfide are removed in vacuo. According to elemental analysis, the sulfur content is 1.9% by weight.

Example 10

The NH$_2$-terminated polymer of Example 4 is mixed with N 550 carbon black in a Haake kneader in accordance with the following Table and the Mooney viscosities (ML 4, 125° C.) are determined:

| Example | Polymer | Parts | Parts carcon black | Mooney |
|---|---|---|---|---|
| 10a | Ex. 4 | 100 | 30 | 18.3 |
| 10b | Ex. 4 | 100 | 40 | 23.5 |
| 10c | Ex. 4 | 100 | 50 | 39.4 |
| 10d (Comp.) | Polysar Butyl 402 | 100 | 40 | 58.5 |

Example 11

The increased reactivity of the polymer according to the invention towards crosslinking agents is illustrated in the following Example. 1 g phenyl isocyanate is added to a solution of the particular polymer (10 g in 50 ml THF) and the content of NCO groups in the solution is determined by titrimetry after various times:

| Time | NCO content |
|---|---|
| a) OH polymer of Example 3b) (comparison) | |
| 1 min. | 8.2 mmol |
| 10 mins. | 7.0 mmol |
| 30 mins. | 4.7 mmol |
| 60 mins. | 2.9 mmol |
| b) NH$_2$ polymer of Example 4 (invention) | |
| 1 min. | 6.3 mmol |
| 10 mins. | 3.2 mmol |
| 30 mins. | 2.2 mmol |
| 60 mins. | 2.2 mmol |

We claim:

1. A process for the production of liquid, saturated polymer corresponding to the following formula

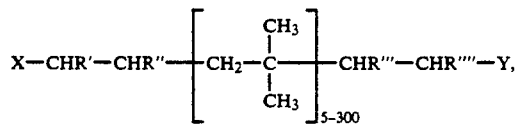

wherein
R′, R″, R‴ and R″″ represent hydrogen or a C$_{1-3}$ alkyl group and at least two of the substituents are hydrogen,
said polymer having a molecular weight M$_n$ of 300 to 10,000 and said polymer bearing groups X and Y—essentially positioned at the ends of the polymer chain—with the meanings OH, SH, NR$^1$R$^2$, N=C=O or N=C(R$^2$)$_2$, X being the same as Y and the number of groups X+Y per polymer being from 1.8 to 2.5,
which comprises solution ozonolysis of a high molecular weight isobutylene/diene copolymer containing 0.5 to 15 mol-% of a diene monomer, characterized in that the products formed after the ozone treatment are stabilized by addition of peroxide decomposers and are decomposed by reduction with hydrogen in the presence of hydrogenation catalysts under pressures of 10 to 300 bar and at temperatures of 20° to 300° C., optionally in the presence of sulfur or amines having the structure NHR$^1$R$^2$ and, where the amine is ammonia, the NH$_2$ groups formed are optionally converted into the groups N=C=O or N=C(R$^2$)$_2$ by reaction with phosgene or with ketones or aldehydes,
R$^1$ representing hydrogen or an optionally substituted aliphatic, cycloaliphatic or aromatic C$_{1-16}$ hydrocarbon radical optionally bearing hydroxyl or amino groups and
R$^2$ representing hydrogen or an optionally substituted aliphatic, cycloaliphatic or aromatic C$_{1-16}$ hydrocarbon radical.

2. A process as claimed in claim 1, characterized in that high molecular weight isobutylene/isoprene copolymer containing 0.5 to 15 mol-% isoprene is used for the ozonolysis.

3. A process as claimed in claim 1, characterized in that an aqueous alcoholic sodium hydride solution or an aqueous formaldehyde solution is used for stabilization.

4. A process as claimed in claim 1, characterized in that Raney nickel, copper chromite or platinum catalysts are used as the hydrogenation catalysts in the absence of sulfur while sulfides or polysulfides of the secondary group metals are used as the hydrogenation catalysts in the presence of sulfur.

5. Liquid, saturated polymer corresponding to the following formula

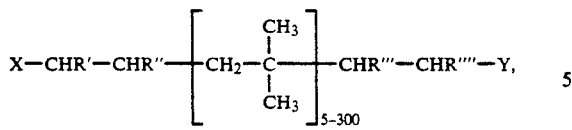

wherein

R', R", R''' and R'''' represent hydrogen or a $C_{1-3}$ alkyl group and at least two of the substituents are hydrogen, said polymer having a molecular weight $M_n$ of 300 to 10,000 and said polymer bearing groups X and Y—essentially positioned at the ends of the polymer chain—with the meanings SH, $NR^1R^2$, $N=C=O$ or $-N=C(R^2)_2$, X being the same as Y and the number of groups X+Y per polymer being from 1.8 to 2.5, and $R^1$ represents hydrogen or an optionally substituted aliphatic, cycloaliphatic or aromatic $C_{1-16}$ hydrocarbon radical optionally bearing hydroxyl or amino groups and $R^2$ represents hydrogen or an optionally substituted aliphatic, cycloaliphatic or aromatic $C_{1-16}$ hydrocarbon radical.

6. A polymer as claimed in claim 5, characterized in that said polymer contains 1.8 to 2.2 mol per mol polymer of groups —SH, $-NHR^1$ or $-N=C=O$ which are essentially positioned at the ends of the polymer chain.

* * * * *